(12) United States Patent
Mamyo (10) Patent No.: US 6,508,453 B2
(45) Date of Patent: Jan. 21, 2003

(54) HIGH-TEMPERATURE GAS CONTROL VALVE

(75) Inventor: Mitsuru Mamyo, Komaki (JP)

(73) Assignee: CDK Corporation, Komaki (JP)

( * ) Notice: Subject to any disclaimer, the term of this patent is extended or adjusted under 35 U.S.C. 154(b) by 14 days.

(21) Appl. No.: 09/825,950

(22) Filed: Apr. 5, 2001

(65) Prior Publication Data

US 2001/0028049 A1 Oct. 11, 2001

(30) Foreign Application Priority Data

Apr. 11, 2000 (JP) ......................................... 2000-108961

(51) Int. Cl.⁷ ................................................. F16K 7/17
(52) U.S. Cl. ........................ 251/63.5; 251/331; 251/368
(58) Field of Search ................................. 251/63.5, 331, 251/63.6, 63, 368

(56) References Cited

U.S. PATENT DOCUMENTS 4,772,513 A * 9/1988 Sakamoto et al. .......... 428/408
5,241,131 A * 8/1993 Bakhru et al. ............. 174/15.1
5,755,428 A * 5/1998 Ollivier ................. 251/63.5 X

* cited by examiner

Primary Examiner—Kevin Lee
(74) Attorney, Agent, or Firm—Oliff & Berridge, PLC (57) ABSTRACT

A high-temperature gas control valve for controlling a flow of a high-temperature gas, includes a valve seat made of metal, a diaphragm made of metal, which is brought into contact with or separated from the valve seat by operation of an actuator, thereby opening and closing the valve. At least one of the diaphragm and the valve seat is coated with an amorphous-carbon film.

6 Claims, 10 Drawing Sheets

HIGH-TEMPERATURE GAS CONTROL VALVE

BACKGROUND OF THE INVENTION

1. Field of the Invention

The present invention relates to a high-temperature gas control valve for controlling a flow of a high-temperature gas to be used in semiconductor manufacturing equipment or process.

2. Description of Related Art

In semiconductor manufacturing equipment, a high-temperature process gas is delivered to a chamber via a gas control valve controlled to open/close for regulating a flow of the gas. As such the gas control valve, generally used is a diaphragm valve in order to prevent the gas from remaining therein. In this diaphragm valve, a metal diaphragm is usually used in consideration of a problem that a diaphragm made of resin (e.g., polyimide resin) may allow gas to permeate therethrough.

Accordingly, a valve section of the gas control valve is constructed of a combination of a metal diaphragm made of stainless steel and a valve seat made of resin.

In recent years, however, the temperature of gas to be used in the semiconductor manufacturing process has been increased up to 300° C. In association with this, the resinous valve seat could not provide sufficient durability compared with the metal diaphragm. The resinous valve seat is produced as a standard product. On the other hand, there is used a gas control valve provided with a valve seat made of metal such as stainless steel and the like, instead of resin. This metal valve seat forms a metal seal with respect to the metal diaphragm in the gas control valve.

However, the gas control valve in which the metal seal is made has a problem of an extremely short life.

Figure 3:
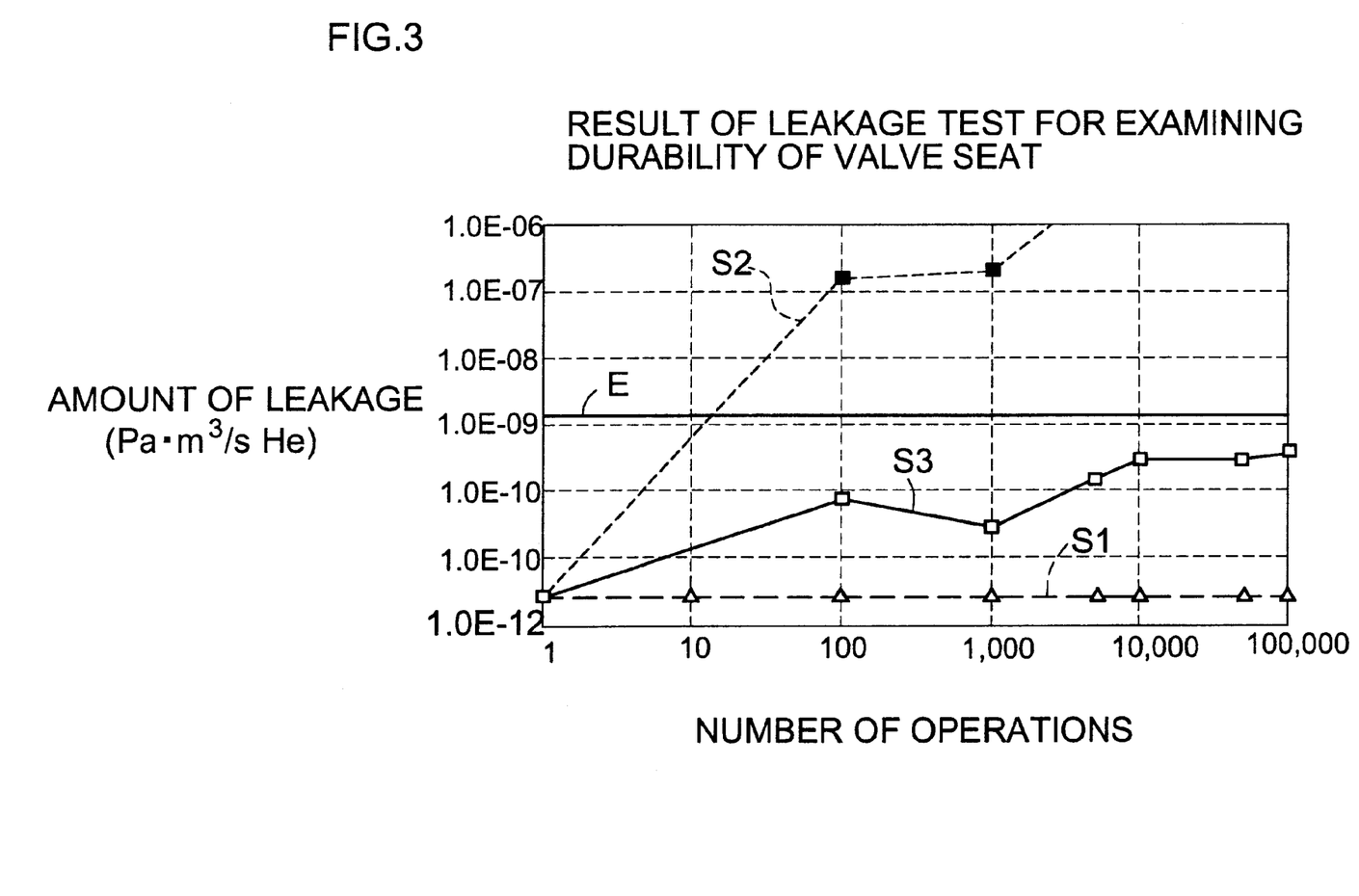
FIG. 3 is a graph of leakage test results showing the amount of gas leakage with respect to the number of opening and closing operations of the gas control valves in the present embodiment and the prior art.

Hence, a leakage test for examining durability was made on the conventional gas control valve in a case of controlling a normal-temperature (23° C.) gas and in another case of controlling a high-temperature (300° C.) gas. Test results thereof are shown in FIG. 3. FIG. 3 is a graph showing the amount of leaked gas with respect to the number of operations of repeatedly opening and closing the gas control valve in each case. In this graph, a line S1 denotes a result obtained in the case of regulating the normal-temp. gas. S2 denotes another result obtained in the other case of regulating the high-temp. gas. It is to be noted that a line S3 is a test result obtained about the apparatus of the present invention (mentioned later) when operated for the high-temp. gas. A reference value E indicates an upper limit of leakage standards. As a result of this leakage test, as seen from the graph, in the case of the normal-temp. gas (S1), the amount of leakage was substantially unchanged throughout the operations and the valve could maintain its initial sealing capability even after one hundred thousand operations. On the other hand, in the case of the high-temp. gas (S2), the amount of leakage exceeded the reference value E after several tens of operations.

Figure 6A:
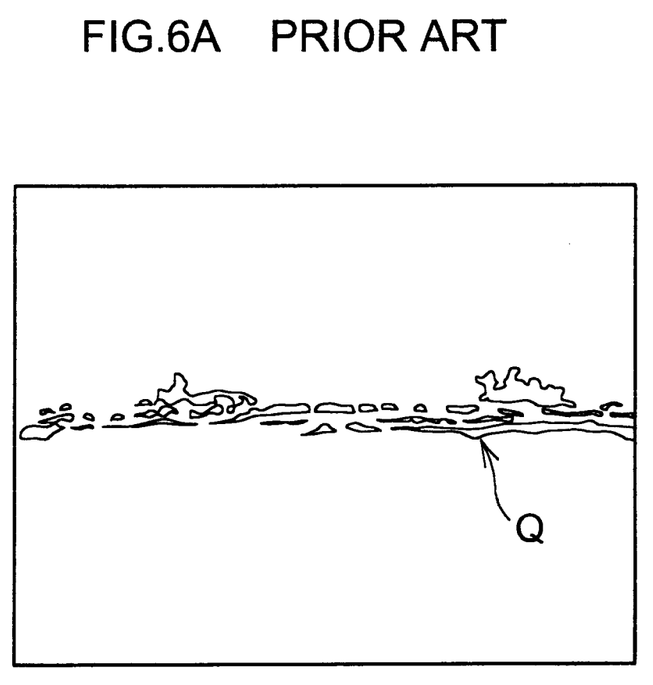
FIGS. 6A and 6B are diagrams illustrating microscope photographs (FIGS. 9A and 9B) of parts of a conventional diaphragm and a conventional valve seat, taken after one hundred thousand operations to regulate a normal-temperature (23° C.) gas.
Figure 6B:
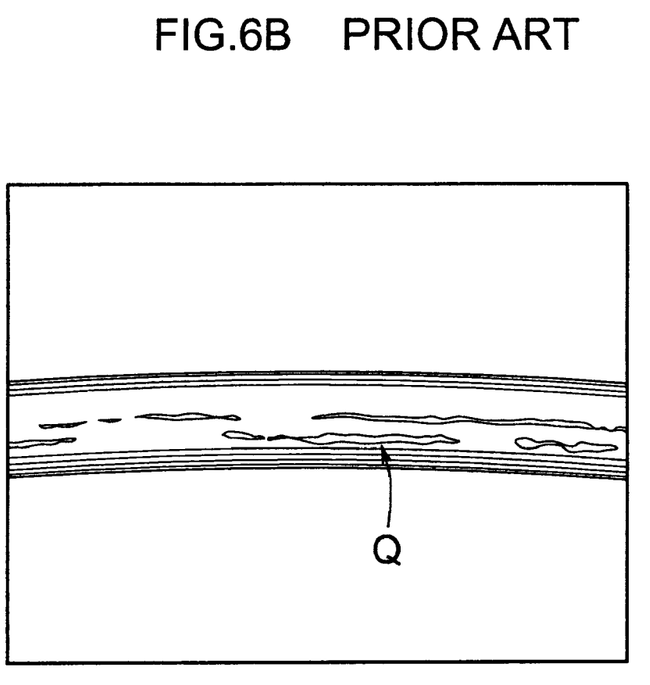
Figure 7A:
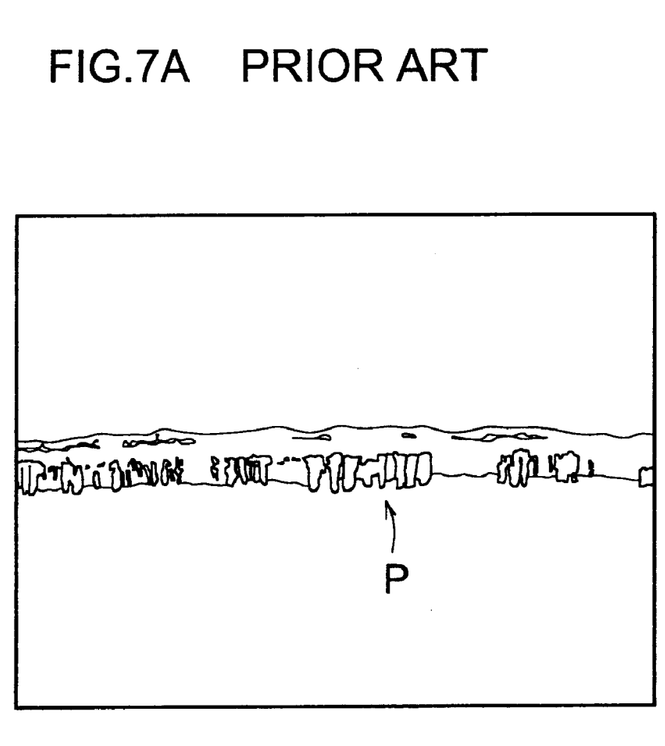
FIGS. 7A and 7B are diagrams illustrating microscope photographs (FIGS. 10A and 10B) of parts of a conventional diaphragm and a conventional valve seat, taken after ten thousand operations to regulate the high-temp. (300° C.) gas.
Figure 7B:
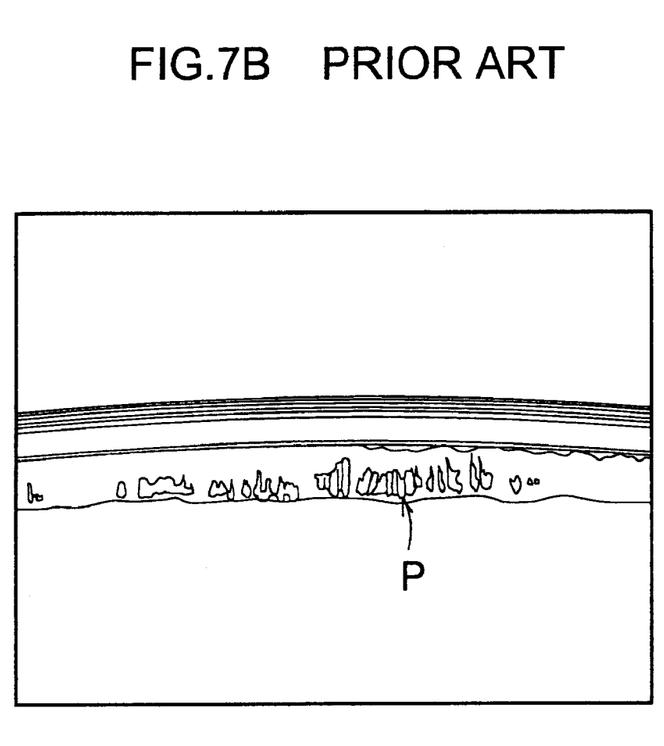
Figure 9A:
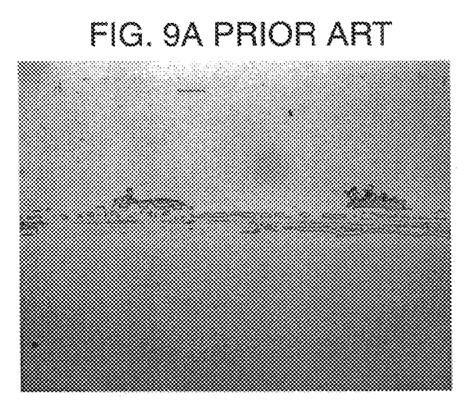
FIGS. 9A and 9B are microscope photographs of parts of the conventional diaphragm (A) and valve seat (B) taken after one hundred thousand operations to regulate the normal-temp. (23° C.) gas.
Figure 9B:
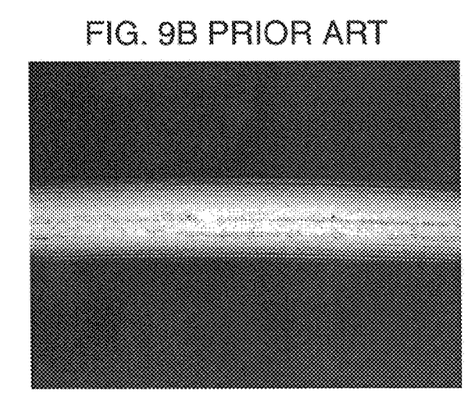
Figure 10A:
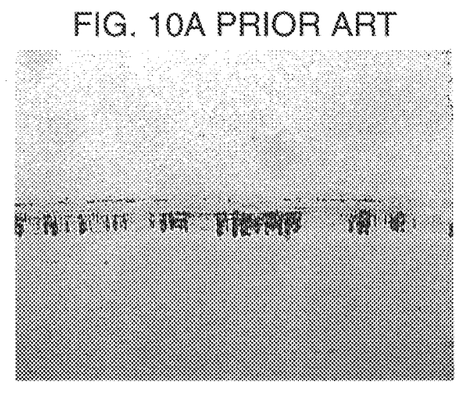
FIGS. 10A and 10B are microscope photographs of parts of the conventional diaphragm (A) and valve seat (B) taken after ten thousand operations to regulate the high-temp. (300° C.) gas.
Figure 10B:
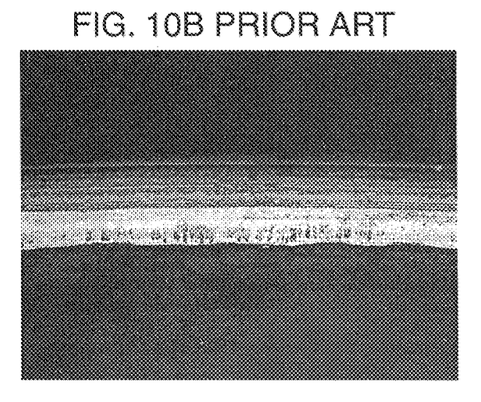

Sealing portions of the diaphragm and the valve seat after the above durability test are shown in plan views in FIGS. 6 and 7. FIGS. 6A and 6B are diagrams illustrating microscope photographs (FIGS. 9A and 9B) of parts of annular sealing portions, namely, contact surfaces of the diaphragm and the valve seat, respectively, of the valve which was operated to open and close one hundred thousand times to control the normal-temp. gas (23° C.). FIGS. 7A and 7B are diagrams illustrating microscope photographs (FIGS. 10A and 10B) of parts of annular sealing portions, namely, contact surfaces of the diaphragm and the valve seat, respectively, of the valve which was operated to open and close ten thousand times to control the high-temp. gas (300° C.).

From the durability test, it was confirmed the reason why the sealing portions of the diaphragm and the valve seat caused gas leakage. That is, comparing FIGS. 6A and 6B and FIGS. 7A and 7B, it is found that the sealing portions of the gas control valve for the high-temp. gas (FIGS. 7A and 7B) had many linear large scratches extending in the direction of the radius of the sealing portions (in an up-and-down direction in the figures), for example, at the portion indicated by an arrow P. Such the scratches were not generated in the valve for the normal-temp. gas (FIGS. 6A and 6B).

On the other hand, in the sealing portions of the valve for the normal-temp. gas shown in FIGS. 6A and 6B, scratches were generated along the annular sealing portions, for example, at a portion indicated by an arrow Q, by the contact between the diaphragm and the valve seat. However, no scratches which might cause the gas leakage were generated even after one hundred thousand opening and closing operations.

The linear scratches P shown in FIGS. 7A and 7B, which were produced in the sealing portions in the case of the high-temp. gas, appear on both the diaphragm and the valve seat. Thus, it is likely that those scratches produce cracks which provide communication between a primary side (the inside of the valve seat 26, namely, the passage leading to the input port 27) and a secondary side (the outside of the valve seat 26, namely, the passage leading to the output port 28) of the sealing portions in a valve closed state, causing the leakage of gas through the sealing portions.

The above conventional gas control valve also has a problem that rubbing of the diaphragm and the valve seat produces a large amount of dusts, forming particles which reduce yields of the semiconductor manufacture.

Therefore, it is urgently necessary in the semiconductor manufacture field to develop a gas control valve adaptable for a high-temp. process gas.

SUMMARY OF THE INVENTION

The present invention has been made in view of the above circumstances and has an object to overcome the above problems and to provide a high-temperature gas control valve with high durability, capable of controlling the flow of a high-temperature gas.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a high-temperature gas control valve for controlling a flow of a high-temperature gas, including: a valve seat made of metal; a diaphragm made of metal, which is brought into contact with or separated from the valve seat by operation of an actuator, thereby opening and closing the valve; wherein at least one of the diaphragm and the valve seat is coated with an amorphous-carbon film.

According to the present invention, the amorphous carbon film is formed on at least one of the diaphragm and the valve seat. The diaphragm and the valve seat with an amorphous structure can have a low coefficient of friction and the excellent resistance to adhesion. This can achieve a high-temp. gas control valve for controlling a flow of a high-temp. gas, which can perform opening-and-closing operations a sufficient number of times without causing gas leakage, and also minimize the generation of particles.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
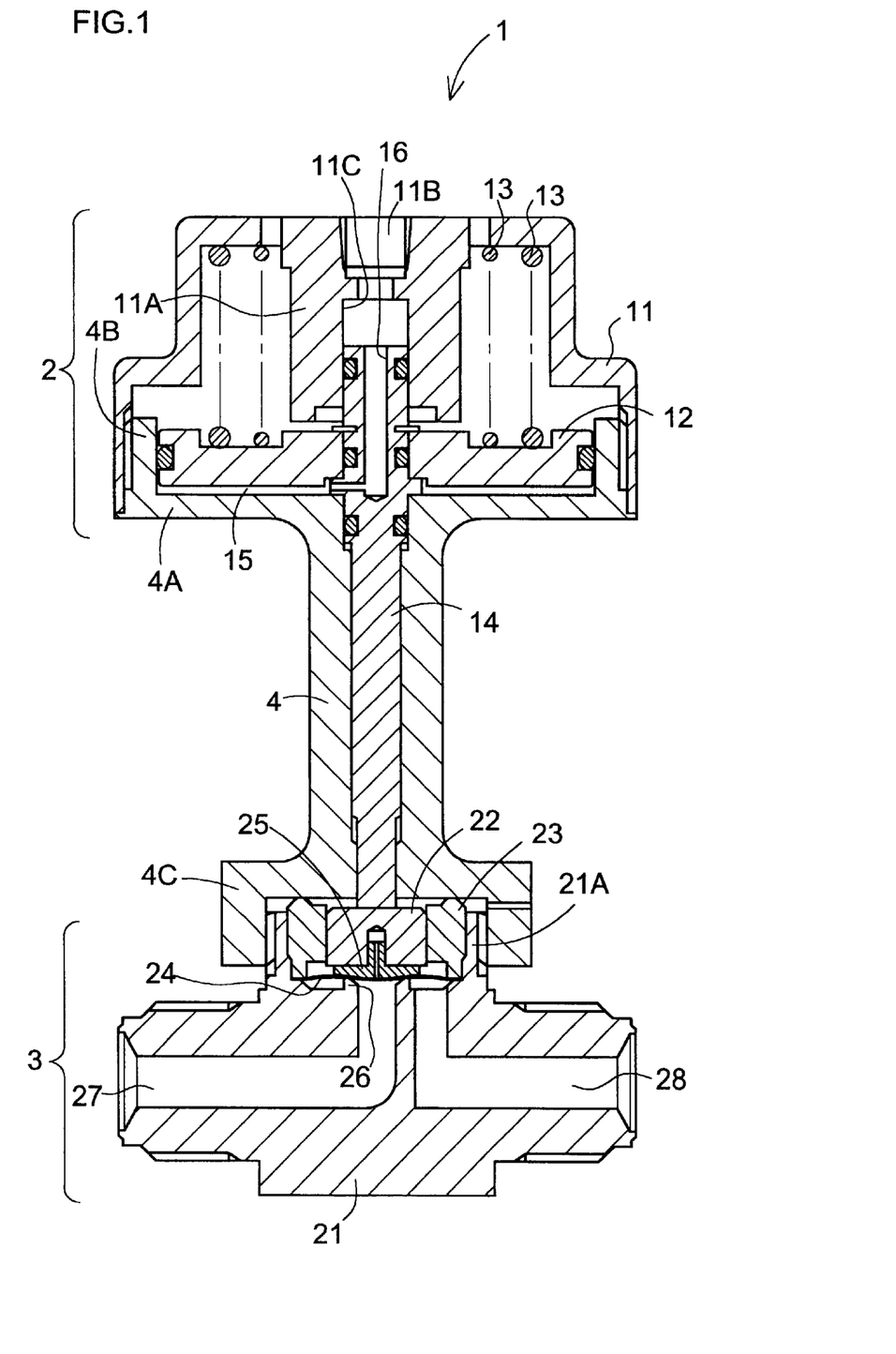
FIG. 1 is a sectional view of a high-temp. gas control valve in an embodiment according to the present invention, the valve being in a closed state.
Figure 2:
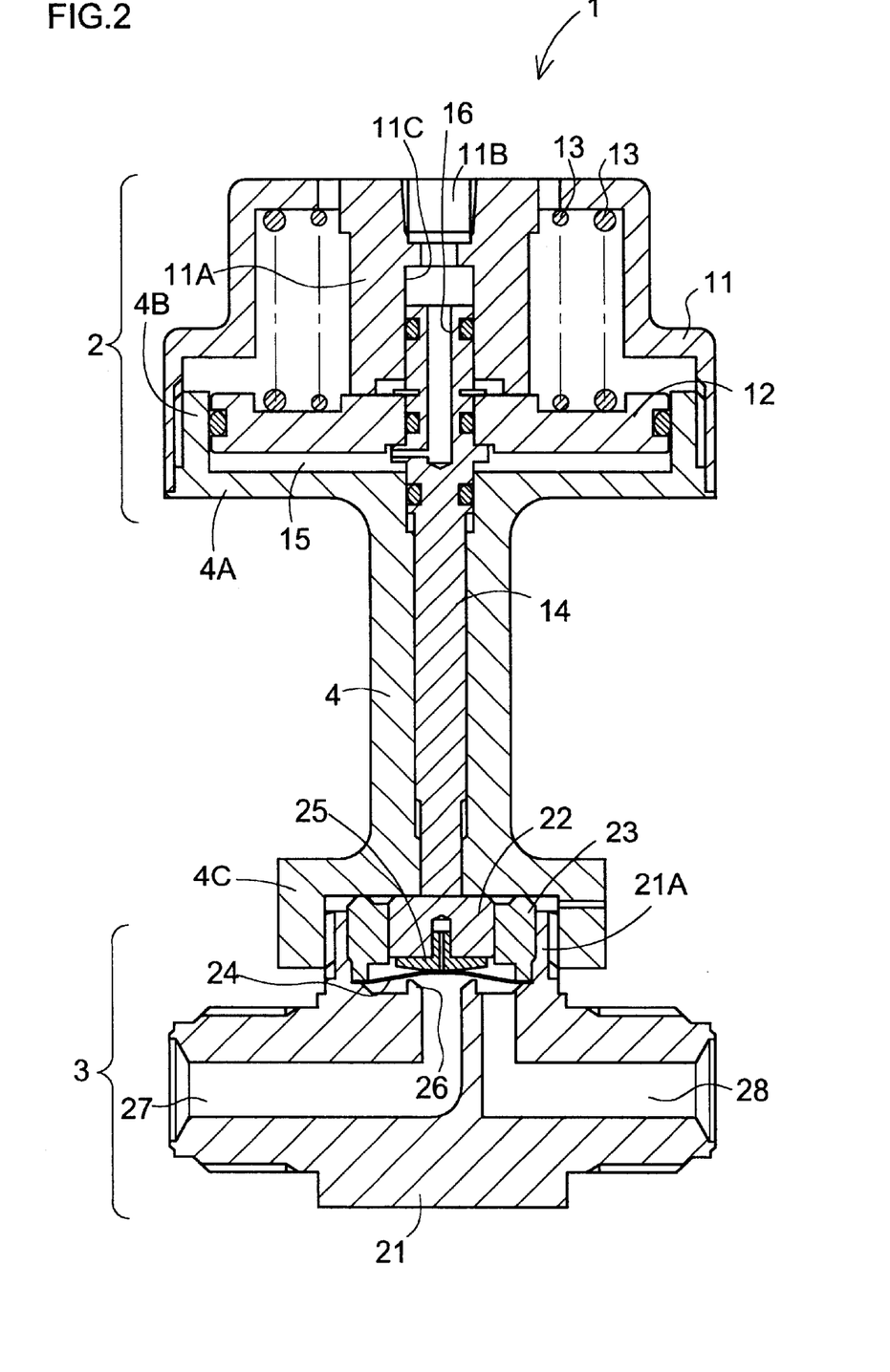
FIG. 2 is a sectional view of the gas control valve being n an opened state.

A detailed description of a preferred embodiment of a high-temperature gas control valve adapted for regulating a high-temperature gas (process gas to be used in semiconductor manufacturing process or equipment) embodying the present invention will now be given referring to the accompanying drawings. FIG. 1 is a sectional view of the high-temp. gas control valve in the present embodiment, which is in a closed state. FIG. 2 is a sectional view of the same in an opened state.

A high-temp. gas control valve (hereinafter simply referred to as a gas control valve) 1 is an air-operated valve which is controlled by air pressure to open and close. As shown in FIG. 1, the gas control valve 1 is constructed of a cylinder section 2 configuring an upper part, a valve section 3 configuring a lower part, and a cylindrical base 4 disposed between the upper and lower parts. Thus, the valve 1 has a longitudinal design.

The base 4 is provided with a flange 4A outwardly extending from the upper end of the base 4 and a cylindrical guide 4B formed upwardly protruding on the circumference of the flange 4A. The cylinder section 2 includes a cap 11 having a shoulder portion with an internal screw-thread. This cap 11 is secured on the guide 4B with an external screw-thread which is engaged with the screw-thread of the cap 11. Within the guide 4B, a piston 12 is slidably disposed and urged downward from above by springs 13 mounted in the cap 11. The cap 11 is provided with a guide portion 11A projecting inward (downward in the drawing) at a center. This guide portion 11A is formed with a pilot port 11B and a guide hole 11C which communicate with each other in a longitudinal direction in the drawing. This guide hole 11C serves to guide movement of a piston rod 14. The piston rod 14 is formed with a pilot hole 16 which provides communication between the guide hole 11C and a pressure chamber 15 formed under the piston 12.

The base 4 is provided, at its lower end, with an attachment portion 4C formed with an internal screw-thread which engages with an external screw-thread of a cylindrical portion 21A of a valve body 21, thereby attaching the base 4 to the valve body 21, forming a single-piece configuration. The piston rod 14 slidably inserted in a longitudinal through hole of the base 4 has a length so that the lower end reaches the valve section 3 and comes into contact with an outer stem 22 in the valve closed state. The outer stem 22 is slidably mounted in a holder 23 fit in the cylindrical portion 21A of the valve body 21. An inner stem 25 is disposed under and fixed to the outer stem 22. A diaphragm 24 for performing the opening-and-closing operations of the valve is arranged in the inside of the cylindrical portion 21A under the inner stem 25 so that the circumferential end of the diaphragm 24 is fixedly sandwiched between the lower end of the holder 23 and the cylindrical portion 21A, thereby covering a valve seat 26 formed projecting upward in the valve body 21 and facing the inner stem 25. The valve body 21 is formed with a passage with an input port 27 and another passage with an output port 28. Those passages are allowed to communicate with each other through the valve seat 26 in an opened state of the valve.

In the gas control valve 1 constructed as above, normally, the piston 12 urged downward by a force of the spring 13 is positioned at a bottom dead center as shown in FIG. 1. In this state, the piston rod 14 pushes the outer stem 22 downward, pressing the diaphragm 24 against the valve seat 26 through the inner stem 25. The gas control valve 1 in the present embodiment is of a normal closed type which closes the valve during a normal state.

In a valve opened state, compressed air is supplied via the pilot port 11B into the pressure chamber 15 through the pilot hole 16. As shown in FIG. 2, the piston 12 is thus moved upward by the compressed air against the force of the spring 13. With the upward movement of the piston 12, the piston rod 14 is also moved upward, allowing the outer stem 22 to free move. Then, the diaphragm 24 is pushed up from below by the pressure of gas flowing from the inlet 27 into the passage, pushing the outer stem 22 upward, thereby bringing the valve in an opened state.

On the other hand, when the air is purged from the pressure chamber 15, the diaphragm 24 is pressed again against the valve seat 26 by the force of the spring 13, bringing the valve in the closed state.

Meanwhile, in relation to the gas leakage during the above valve closed state, it was found as mentioned above that the conventional gas control valve had the scratches P as shown in FIG. 7 which might cause the gas leakage. This is considered as resulting from the friction and the abrasion between the diaphragm and the valve seat which come into contact with each other.

When the opening and closing operations are repeated, the contact surfaces of the diaphragm and the valve seat would be rubbed. Normally, moisture is adhered to each of the surfaces of the diaphragm and the valve seat, which acts as a lubricant for reducing frictional resistance during the operations at normal temperatures. In the case where the high-temp. gas is treated, however, the moisture may evaporate, so that the surfaces are dried.

In the case where the normal-temp. gas is treated, therefore, moisture acts as a lubricant to prevent the generation of scratches due to the rubbing of the contact surfaces of the diaphragm and the valve seat. On the other hand, in the case where the high-temp. gas is treated, the diaphragm and the valve seat are brought in contact with each other with the surfaces dried. This may increase the frictional resistance and generate the scratches P shown in FIGS. 7A and 7B which would cause gas leakage. In particular, at high temperatures, abrasion will occur in the sealing portions which come into contact or separate from each other, which may generate deeper scratches P.

To solve the above problems, the gas control valve 1 in the present embodiment is constructed to take measures against the process gas of a high-temperature to be regulated.

In the gas control valve 1 in the present embodiment, the diaphragm 24 is made of an alloy of nickel and cobalt (Ni—Co alloy) and the valve body 21 is made of stainless steel (for example, SUS 316). In addition, the surface of the valve seat 26 of the valve body 21 is coated with an amorphous-carbon film.

To form the amorphous-carbon film, a carbon material such as diamond-like carbon (DLC), graphite-like carbon (GLC), and others is used. The amorphous-carbon film is made by utilizing a thin film manufacturing process in vacuum plasma, which has been developed in association with the progression of semiconductor manufacturing techniques. A carbon atom has four unpaired electrons which form a covalent bond. The bonding form varies depending on how to take an orbit of the four electrons, and the physical property also changes. For instance, the diamond-like carbon film is considered as including a single bond and a double bond in an amorphous structure having no long-range order.

The amorphous-carbon film is of a minute amorphous structure having no grain boundary, thus providing a very smooth surface thereon. For example, a three-dimensional image of a microscopic region of the diamond-like carbon film has notable smoothness as compared with a TiN film made by physical vapour deposition (PVD) methods.

Consequently, the valve seat 26 coated with the amorphous-carbon film is given the surface having an extremely low coefficient of friction. Owing to such the surface, the valve seat 26 can be excellent in adhesion resistance, abrasion resistance, and the like.

The above amorphous-carbon film may be formed by for example an ion plating method which is one of the PVD methods. To be more specific, hydrocarbon gas is decomposed by arc discharge plasma in a high vacuum, and ions and excited molecules in the plasma are made to collide against the diaphragm 24 or the valve seat 26, forming the film thereon. Converting the collision energy of discharged particles into a temperature, it corresponds to temperatures of several tens of thousands degrees, which locally forms a high temperature and pressure condition. This makes it possible to produce a crystalline structure which could not be formed under a normal condition.

According to which film is to be formed, a DLC film or a GLC film, film-forming conditions such as a flow rate of hydrocarbon gas to be ionized, the necessity for heating the diaphragm and others by a heater during the ion plating, and parameters of voltage and others, are selectively determined.

The diamond-like carbon (DLC) is of a high hardness (Vickers hardness) of HV 3000 to HV 5000. Compared with this, the graphite-like carbon (GLC) is of a low hardness of HV 1700 to HV 3000, but it is advantageously high in adhesion properties.

The DLC has no electrical conductivity, while the GLC has electrical conductivity.

Next, a leakage test was carried out on the gas control valve 1 with the valve seat 26 applied with the amorphous-carbon film. A result of this test is shown as a line S3 in FIG. 3. As seen in the graph, the valve 1 in the present embodiment had a large amount of gas leakage as compared with the conventional valve (S1) including the valve seat uncoated with amorphous-carbon film and being tested with the normal-temp. gas, while the amount of gas leakage from the valve 1 did not exceed the reference value E even after opening and closing operations of one hundred thousand times. Hence, the gas control valve 1 in the present embodiment could have sufficient durability with respect to leakage.

Figure 4:
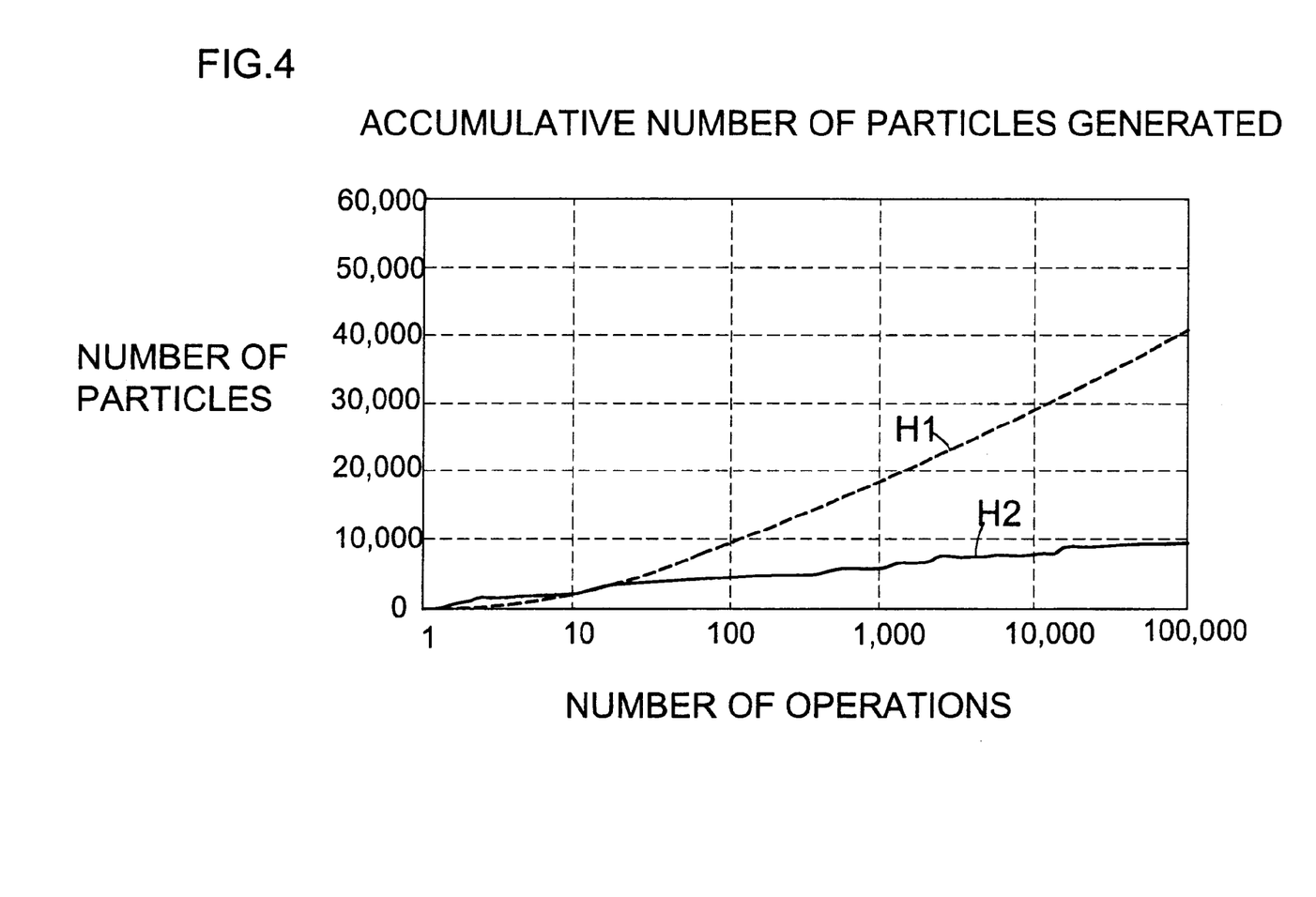
FIG. 4 is a graph showing the number of particles generated in the valves which regulate a normal-temperature gas in the present embodiment and the prior art.

Furthermore, the number of particles generated in the valve was examined. FIG. 4 is a graph showing the number of generated particles with respect to the number of operations in each of the gas control valve 1 in the present embodiment and the conventional one, both using the normal-temp. gas. In FIG. 4, a line H1 indicates a test result on the conventional gas control valve and another line H2 indicates a test result on the gas control valve 1 applied with the coating process in the present embodiment. As seen in the graph, remarkable differences in the number of generated particles were found in association with the increase of the number of operations.

Figure 5A:
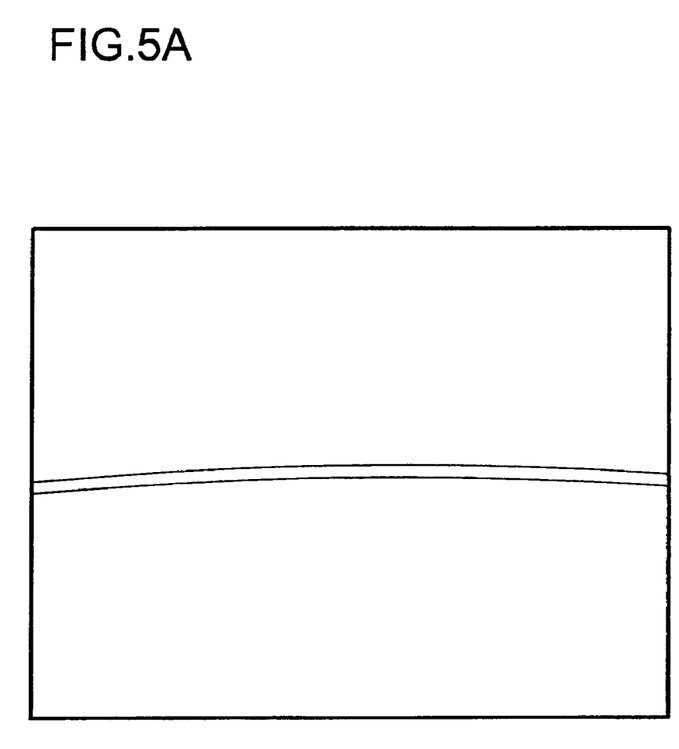
FIGS. 5A and 5B are diagrams illustrating microscope photographs (FIGS. 8A and 8B) of parts of a diaphragm and a valve seat of the valve in the present embodiment, taken after ten thousand operations to regulate a high-temperature (300° C.) gas.
Figure 5B:
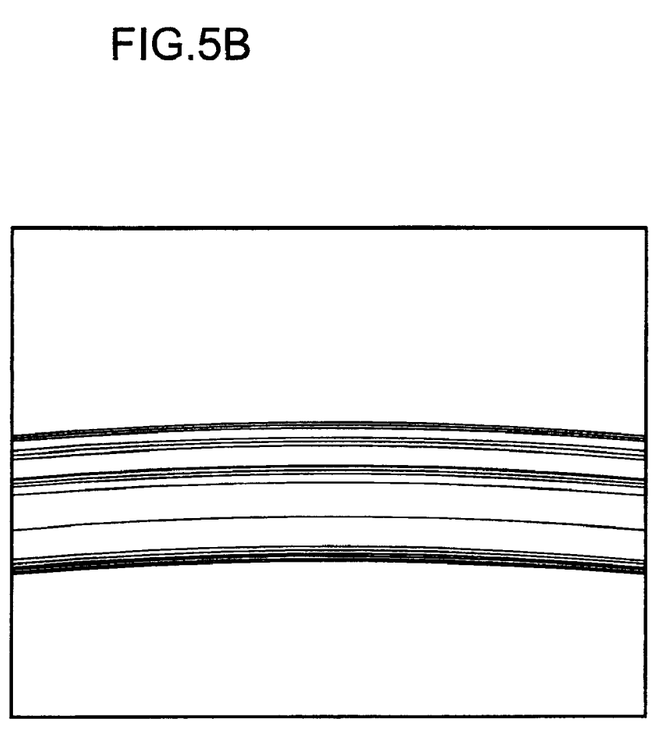
Figure 8A:
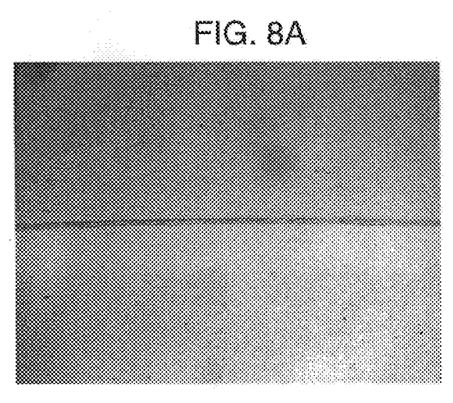
FIGS. 8A and 8B are microscope photographs of parts of the diaphragm (A) and valve seat (B) in the present embodiment taken after ten thousand operations to regulate the high-temp. (300° C.) gas.
Figure 8B:
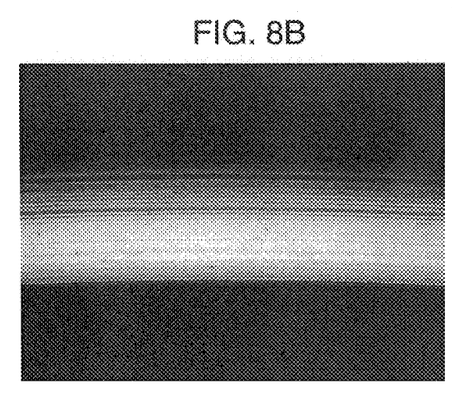

Meanwhile, FIGS. 5A and 5B partially show the sealing portions (i.e., contact surfaces) of the diaphragm 24 and the valve seat 26 of the gas control valve 1 after the durability test in which the valve was operated one hundred thousand times to regulate the high-temp. (300° C.) gas. To be more specific, FIG. 5A is a diagram illustrating a microscope photograph (FIG. 8A) of a part of the diaphragm 24, and FIG. 5B is a diagram illustrating a microscope photograph (FIG. 8B) of a part of the valve seat 26.

The gas control valve 1 on which the test was made has the diaphragm 24 uncoated and the valve seat 26 coated with the DLC film. After the test, both of the diaphragm 24 and the valve seat 26 had not any of the scratches P (FIG. 7) generated in the radial direction in the conventional valve and the scratches Q (FIG. 6) generated by the contact between the conventional diaphragm and valve seat in the durability test using the normal-temp. gas.

This is because the DLC film can increase the surface hardness of the valve seat 26, enhancing scratch-proof, and extremely reduce the coefficient of friction. In other words, the valve seat 26 coated with the amorphous-carbon film such as the DLC film, thereby having the surface of the amorphous structure, can be of a low coefficient of friction and superior resistances to adhesion and abrasion due to the smoothness of the surface. Furthermore, the surface of the amorphous structure can decrease the attack power of the valve seat 26 itself with respect to the diaphragm 24, so that the valve seat 26 would not damage the diaphragm 24 even if they rub against each other.

Consequently, the gas control valve 1 in the present embodiment can be used to regulate a high-temp. gas, and can perform a sufficient number of times of opening-and-closing operations, whereby causing no leakage. In addition, the valve 1 can extremely reduce the generation of particles.

The present invention may be embodied in other specific forms without departing from the spirit or essential characteristics thereof. For instance, in the above gas control valve 1, the amorphous-carbon film is coated on only the valve seat 26. Alternatively, the amorphous-carbon film maybe coated on only the diaphragm 24 instead of the valve seat 26 or on both of the valve seat 26 and the diaphragm 24. Either case can produce the same effect as above.

The gas control valve 1 in the above embodiment is an air operated valve. Alternatively, it may be a solenoid valve using a solenoid.

According to the present embodiment, as mentioned above, the amorphous-carbon film is coated on at least one of the diaphragm and the valve seat, both being made of metal. This can achieve a high-temp. gas control valve with high durability, capable of controlling the flow of a high-temp. process gas.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A high-temperature gas control valve for controlling a flow of a high-temperature gas, including:
   a valve seat made of metal;
   a diaphragm made of metal, which is brought into contact with or separated from the valve seat by operation of an actuator, thereby opening and closing the valve;
   wherein at least one of the diaphragm and the valve seat is coated with an amorphous-carbon film so that when the valve is dried by moisture evaporation during use at a high temperature and the metal diaphragm comes into contact with the metal valve seat, the amorphous-carbon film having a small friction coefficient and high hardness prevents the generation of scratches in the diaphragm and the valve seat which are rubbing against each other in a dried state.

2. The high-temperature gas control valve according to claim 1, wherein the amorphous-carbon film is a diamond-like carbon film.

3. The high-temperature gas control valve according to claim 1, wherein the amorphous-carbon film is a graphite-like carbon film.

4. A high-temperature gas control valve for controlling a flow of a high-temperature gas, including:
   a cylinder section including a piston slidably disposed therein;
   a valve section including a valve seat made of metal and a valve element disposed facing the valve seat and movably in a direction to come into contact or separate from the valve seat in association with the sliding of the piston in the cylinder section;
   a diaphragm made of metal disposed between the valve seat and the valve element, the diaphragm being brought into contact with or separated from the valve seat by operation of an actuator, thereby opening and closing the valve;
   wherein a contact surface of at least one of the diaphragm and the valve seat is coated with an amorphous-carbon film so that when the valve is dried by moisture evaporation during use at a high temperature and the metal diaphragm comes into contact with the metal valve seat, the amorphous-carbon film having a small friction coefficient and high hardness prevents the generation of scratches in the diaphragm and the valve seat which are rubbing against each other in a dried state.

5. The high-temperature gas control valve according to claim 4, wherein the valve includes an air-operated valve in which the piston is moved by air pressure supplied into the cylinder section.

6. The high-temperature gas control valve according to claim 5, wherein the valve is used for regulating the flow of the high-temperature gas to be used in semiconductor manufacturing process.

* * * * *

UNITED STATES PATENT AND TRADEMARK OFFICE
CERTIFICATE OF CORRECTION

PATENT NO.       : 6,508,453 B2
APPLICATION NO.  : 09/825950
DATED            : January 21, 2003
INVENTOR(S)      : Mitsuru Mamyo It is certified that error appears in the above-identified patent and that said Letters Patent is hereby corrected as shown below:

Cover page, item [73] Assignee, change

"CDK Corporation, Komaki (JP)"

to

--CKD Corporation, Komaki (JP)--.

Signed and Sealed this
Tenth Day of April, 2012

David J. Kappos
*Director of the United States Patent and Trademark Office*